000

United States Patent
Ngan et al.

(10) Patent No.: US 6,376,732 B1
(45) Date of Patent: Apr. 23, 2002

(54) WETTED WALL VAPOR/LIQUID SEPARATOR

(75) Inventors: Daniel Yuk-Kwan Ngan; Richard Addison Sanborn; Louis Edward Stein; Raul Jasso Garcia, Sr., all of Houston, TX (US); Vance Jordan Grieshop, Destrehan, LA (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/520,493

(22) Filed: Mar. 8, 2000

(51) Int. Cl.[7] .......................... C07C 7/00; B01D 19/00; B04C 3/00
(52) U.S. Cl. .................. 585/800; 208/308; 55/457; 55/447; 55/464; 96/181; 96/204; 96/205; 96/206; 96/208; 96/215; 96/216; 95/269
(58) Field of Search .................. 55/457, 447, 464; 96/181, 204, 205, 206, 208, 215, 216; 208/308; 585/800; 95/269

(56) References Cited

U.S. PATENT DOCUMENTS

| 2,961,064 A | * | 11/1960 | Fisher | 55/457 |
| 3,546,854 A | * | 12/1970 | Muller | 55/455 |
| 3,729,904 A | * | 5/1973 | York | 55/457 |
| 4,015,960 A | * | 4/1977 | Nutter | 55/355 |
| 4,221,577 A | * | 9/1980 | Lowrie | 55/392 |
| 4,376,676 A | * | 3/1983 | Gill | 196/46 |
| 6,176,900 B1 | * | 1/2001 | Swanborn | 95/269 |

* cited by examiner

Primary Examiner—Walter D. Griffin (57) ABSTRACT

A centrifugal vapor/liquid separator separates the vapor and liquid in a flash of hydrocarbon and steam mixture, such that only the vapor stream is fed and processed further downstream. The design of the separator ensures that all partially wetted surfaces in the separator, except at the vapor outlet pipe, are well-wetted and washed by the non-vaporized liquid portion of the feed or by injection of external liquid thus ensuring that no coke deposition occurs inside the separator. The flash temperature in the separator therefore can be increased beyond the typical limit thus achieving a deeper cut into the feed and recovering a larger fraction of the feed as vapor for further downstream processing.

4 Claims, 4 Drawing Sheets

WETTED WALL VAPOR/LIQUID SEPARATOR

CROSS-REFERENCE TO RELATED APPLICATION

This application is related to Assignee's co-pending application entitled "THERMAL CRACKING OF CRUDE OIL AND CRUDE OIL FRACTIONS CONTAINING PITCH IN AN ETHYLENE FURNACE" and further identified as application Ser. No. 09/520,491, filed on Mar. 8, 2000.

BACKGROUND OF THE INVENTION

1. Field of the Invention

The invention relates to pre-heating hydrocarbon feedstock materials prior to cracking the feedstock. More specifically, the invention relates to the separation of the liquid and vapor components of the feedstock.

2. Description of Related Art

The concept of a flow-through cyclone, for separation of solids or liquids from a carrier gas, is well established in the literature.

Assignee's present olefins gas oil steam cracker plant uses a separator (or knock-out pot) to separate heavy hydrocarbon in the feed before the vaporizable fraction of the heavy feed enters the radiant tubes of a pyrolysis furnace.

The vane portion of the vapor/liquid separator design disclosed herein, which is used to impart the centrifugal force necessary for separation of the incoming gas and liquid phases, is similar to that originally designed by Assignee and which is currently used in Assignee's Catalytic Cracking Unit's (CCU) "third-stage separators"(TSS), for separating very fine (typically less than 20 micron) solid catalyst particles from flue gas exiting CCU regenerator vessels. This work focused on separation of dry cat cracking catalyst from a vapor stream, flow was downward through the vane assembly, then the gas would reverse and flow upward through the central hub. Catalyst fines drop out through the bottom of the separator. The vane design disclosed herein was selected since it provides a very smooth aerodynamic acceleration and spin to the incoming gas/liquid mixture necessary to achieve high separation efficiency and low pressure loss. The vane design is further distinguished by its lack of stagnant zones which would lead to areas of coke deposition. In addition, unlike conventional tangential entry type cyclone separators which typically feature a single, asymmetrical inlet slot or pipe opening, the vane itself is comprised of a series of vane elements or blades which are responsible for imparting a uniform centrifugal force to the incoming gas/liquid mixture along the entire circumference of the inlet section of the vapor/liquid separator.

SUMMARY OF THE INVENTION

A specially designed centrifugal vapor/liquid separator separates the vapor and liquid in a flash of hydrocarbon and steam mixture, such that only the vapor stream is fed and processed further downstream. The design of the separator ensures that all partially wetted surfaces in the separator, except at the vapor outlet pipe, are well wetted and washed by the non-vaporized liquid portion of the feed. The surface wetting requirement ensures that no coke deposition that would eventually lead to plugging of the separator occurs inside the separator. With the surface-wetting provision preventing coking, the flash temperature in the separator can be increased beyond the typical limit (limited because of the coking concern), thus achieving a deeper cut into the feed and enabling the recovery of a larger fraction of the feed as vapor for further downstream processing.

One application of the instant vapor/liquid separator is in pre-processing heavy olefins plant feed (crude or condensates) by flashing the hydrocarbon feed with steam at high temperature, then mechanically separating the non-vaporizable liquid fraction by this vapor/liquid separator so that only the vaporizable fraction of the feed is fed further downstream to be processed in the radiant tubes of a thermal pyrolysis furnace. The liquid, non-vaporizable portion contains heavy hydrocarbons such as pitch which are separated and sent to a coker, cat cracker, or other residue-processing units for further processing, or as fuel.

This particular invention further distinguishes itself by relying on uniformly wetted walls to mitigate coking that would reduce the service life of a normally operated, non-irrigated cyclone. The multiple-inlet type of vane design described herein is especially well suited to the creation and maintenance of a uniform film of irrigating liquid on the internal surfaces of the vapor/liquid separator.

DESCRIPTION OF THE PREFERRED EMBODIMENTS

The heavy ends of crude oils and heavy natural gas liquids cannot be vaporized under typical ethylene furnace convection section conditions. They are normally removed by distillation, and only the lighter, vaporizable fraction from the distillation is used as olefin plant feeds. The feed preparation step of distilling off the heavy ends from the olefins plant feed require additional capital and operating cost. The present inventive apparatus and process integrates the heavy end separation step with the feed pre-heater section of the modified olefins furnace, allowing only the vaporizable fraction of the heavy feed to enter the cracking zone of the furnace.

Furthermore, the ability to flash the hydrocarbon with dilution steam at a temperature higher than that typically achievable in a vacuum column (750° F.), results in a higher fraction of the crude oil being recovered as olefins plant feed than that recovered through the atmospheric/vacuum distillation columns, thus reducing the yields of the lower value heavy end pitch. This is achieved through a non-coking vapor/liquid separator design according to the instant invention. The vapor/liquid separator can be operated over a wide range of temperatures, e.g., 500–900° F. Optimal conditions are determined by acceptable coking over a desired temperature range.

The convection section of a typical olefin pyrolysis furnace is modified such that heavy hydrocarbon feeds can be fed directly to the cracking furnace. Heavy hydrocarbon feeds include desalted crude oils, heavy natural gas liquids, long and short residues which contain heavy tail-end hydrocarbons that cannot be completely vaporized under normal operating conditions in the convection section of an olefins pyrolysis furnace.

Figure 1:
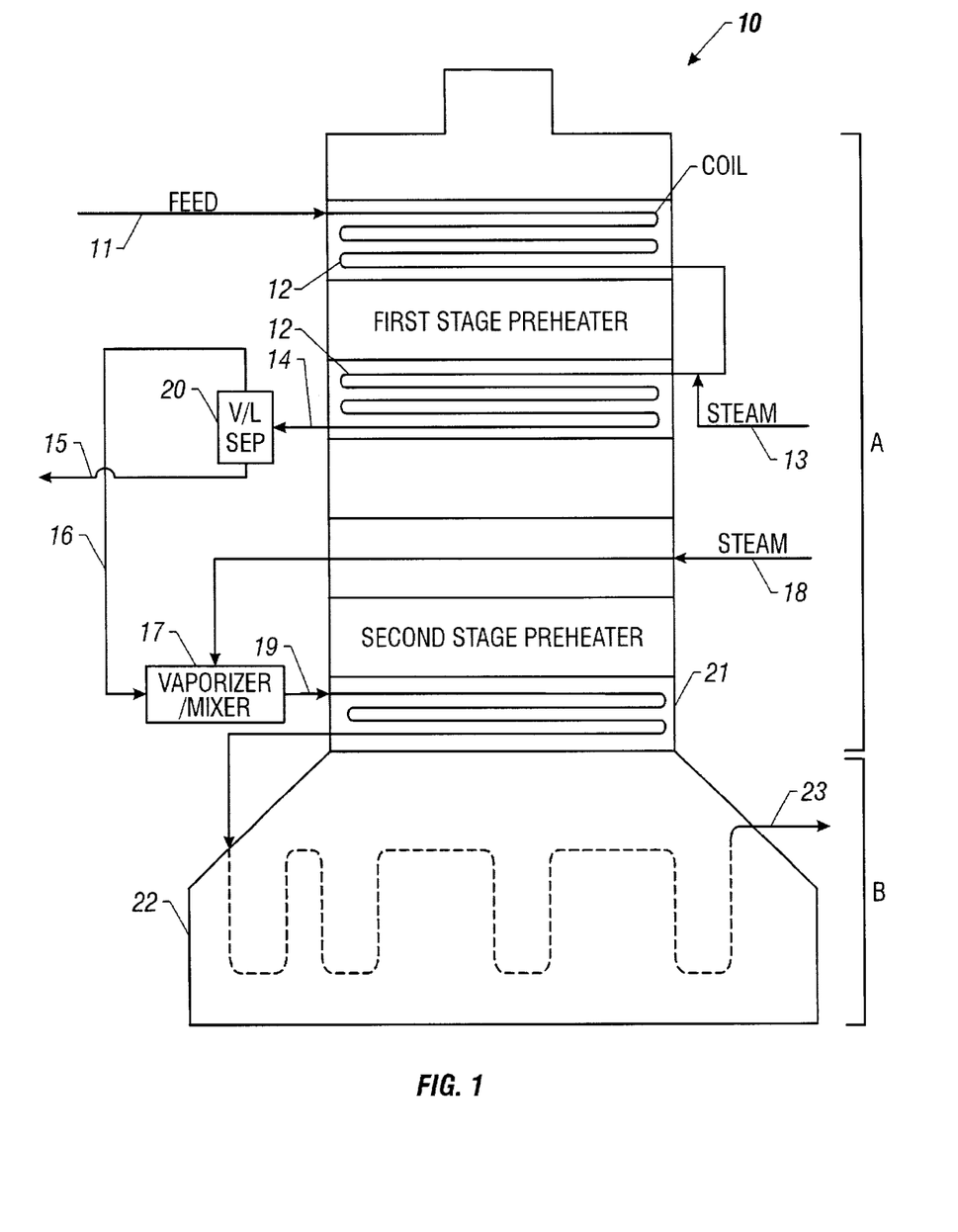
FIG. 1 is a schematic of a flow diagram of the overall process in a pyrolysis furnace which may be used with the instant invention.

Referring now to FIG. 1 which is a schematic view of an ethylene furnace 10, the heavy hydrocarbon feed 11 enters through first stage preheater 12 of the convection section A of ethylene furnace 10 at a temperature of about 285° F. and at a pressure of 300 psig. A small amount of dilution steam 13 (saturated steam at ~100 psig) is fed into the convection section preheater tubes until it is heated to a temperature ranging from about 650–900° F. at a pressure of about 70–80 psig, at which point the mixed hydrocarbon and steam 14 is fed into a vapor/liquid separator 20. The vapor/liquid separator 20 removes the non-vaporized portion 15 of the mixed hydrocarbon feed and steam 14, the non-vaporized liquid 15 being withdrawn and separated from the fully vaporized hydrocarbon 16. Depending on the heavy hydrocarbon feed 11, different processing schemes may be employed.

The vaporized portion 16 of the mixed hydrocarbon feed and steam 14 subsequently fed through a vaporizer/mixer 17, in which the hydrocarbon vapor 16 mixes with superheated steam 18 to heat the mixture 19 temperature to about 950–1050° F. external to the furnace 10. The mixture 19 is then heated further in the second stage preheater portion 21 of the convection section A of the olefins pyrolysis furnace 10 and is subsequently fed into the radiant section B, 22 of the pyrolysis furnace 10 where the hydrocarbon mixture 19 is thermally cracked.

The conditions of the hydrocarbon/steam mixture 14 at the entrance of the vapor/liquid separator 20 are dependent on the heavy hydrocarbon feed 11 properties, with the requirement that there always be enough non-vaporized liquids 15 (between 2–40 vol % of feed, preferably 2–5 vol %) to wet the internal surfaces of the vapor/liquid separator 20. This wetted wall requirement is essential to prevent coke formation and deposition on the surface of the separator 20. The degree of vaporization (or vol % of non-vaporizable liquid 15) can be controlled by adjusting the dilution steam/ feed ratio and flash temperature of the hydrocarbon/steam mixture 14.

The vapor/liquid separator 20 described herein permits separation of the liquid 15 and vapor 16 phases of the flash mixture in such a manner that coke solids are not allowed to form and subsequently foul either the separator 20 or the downstream equipment (not shown). On account of its relatively compact construction, the wetted- wall vapor/ liquid separator 20 design can achieve a higher temperature flash than that in a typical vacuum crude column, thus effecting the recovery of a higher vaporized fraction 16 of the feed 11 for further downstream processing. This increases the fraction of hydrocarbon feed 11 which can be used for producing higher valued products 23, and reduces the fraction of heavy hydrocarbon liquid fraction 15 having a lower value.

Figure 2:
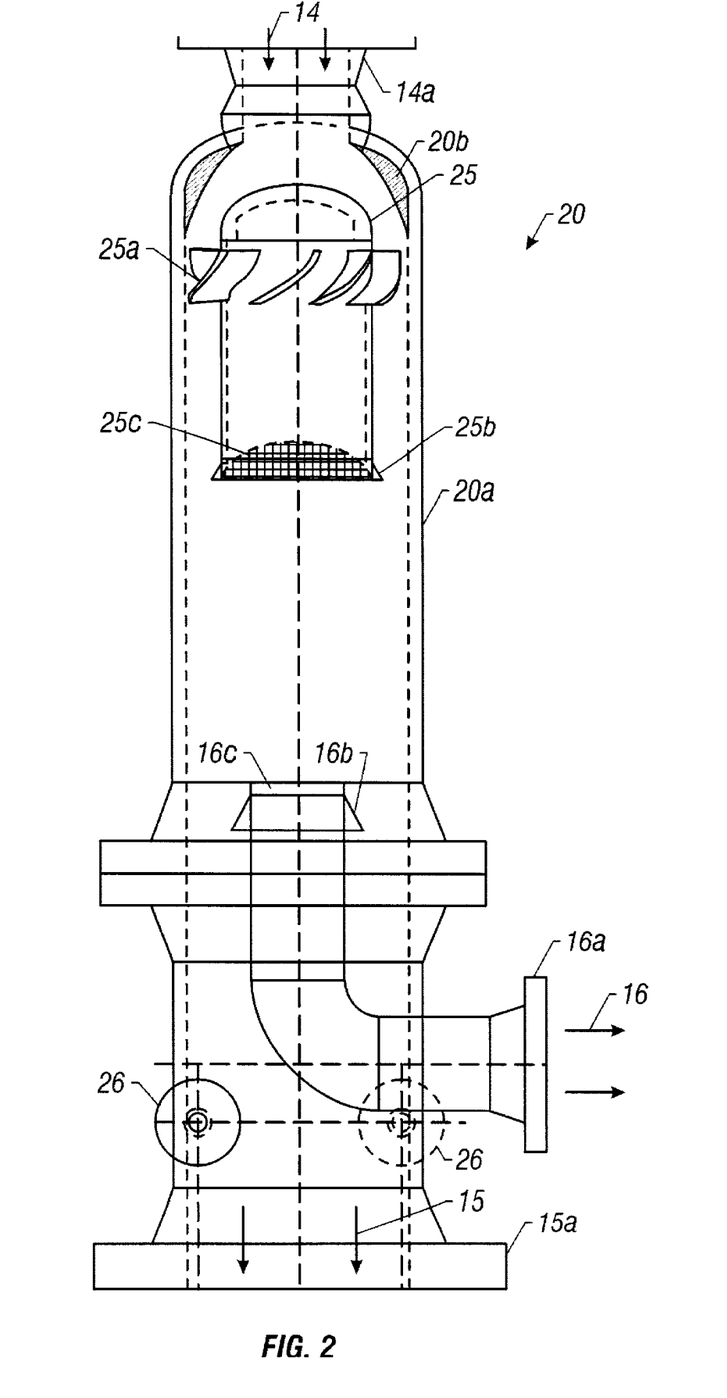
FIG. 2 is an elevational view, partly in section, of a vapor/liquid separator according to the invention.
Figure 3:
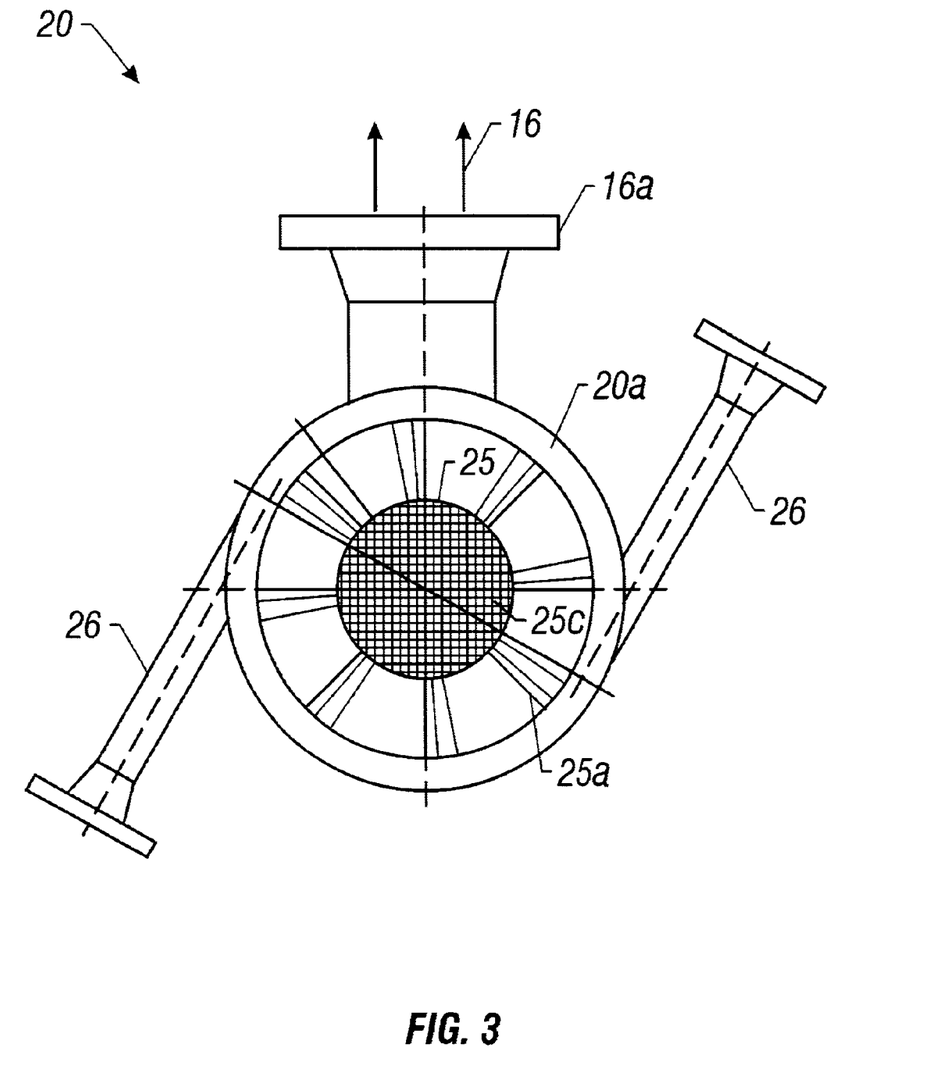
FIG. 3 is a plan view of FIG. 2.

Referring now to FIGS. 2 and 3, the vapor/liquid separator 20 is shown in a vertical, partly sectional view in FIG. 2 and in a sectional plan view in FIG. 3. The vapor/liquid separator 20 comprises a vessel having walls 20a, an inlet 14a for receiving the incoming hydrocarbon/steam mixture 14, a vapor outlet 16a for directing the vapor phase 16 and a liquid outlet 15a for directing the liquid phase 15. Closely spaced from the inlet 14a is a hub 25 having a plurality of vanes 25a spaced around the circumference of the hub 25, preferably close to the end nearest the inlet 14a. The vane assembly is shown more clearly in the perspective view of FIG. 4. The incoming hydrocarbon/steam mixture 14 is dispersed by splashing on the proximal end of the hub 25 and, in particular, by the vanes 25a forcing a portion of the liquid phase 15 of the mixture 14 outwardly toward the walls 20a of the vapor/liquid separator 20 thereby keeping the walls 20a completely wetted with liquid and preventing any coking of the interior of the walls 20a. Likewise, the outer surface of the hub 25 is maintained in a completely wetted condition by a liquid layer that flows down the outer surface of hub 25 due to insufficient forces to transport the liquid 15 in contact with the surface of hub 25 to the interior of the walls 20a. A skirt 25b surrounds the distal end of the hub 25 and aids in forcing any liquid transported down the outer surface of the hub 25 to the interior of the walls 20a by depositing said liquid into the swirling vapor. The upper portion of the vapor/liquid separator 20 is filled in at 20b between the inlet 14a and hub 25 to aid wetting of the interior of walls 20a as the vapor/liquid mixture 14 enters the vapor/liquid separator 20. As the liquid 15 is transported downward, it keeps the walls 20a and the hub 25 washed and prevents the formation of coke on their surfaces. The liquid 15 continues to fall and exits the vapor/liquid separator 20 through the liquid outlet 15a. A pair of inlet nozzles 26 is provided below the vapor outlet tube 16a to provide quench oil for cooling collected liquid and reduce downstream coke formation The vapor phase 16 enters the vapor outlet duct 16a at its highest point 16c, exits at outlet 16a and proceeds to a vaporizer 17 for further treatment prior to entering the radiant section B 22 of the pyrolysis furnace 10 as shown in FIG. 1. A skirt 16b surrounds the entrance 16c to the vapor duct 16 and aids in deflecting any liquid 15 outwardly toward the separator walls 20a.

EXAMPLE 1

A 70% scale, cold-flow clear plastic and metal model using water and air was tested and refined in the laboratory. In the cold-flow test model, the vapor/liquid separation was so effective that no liquid phase was detected at the vapor outlet, and visual observation showed that the internal surfaces of the model vapor/liquid separator remained well-irrigated by an active flow of the incoming liquid phase over these surfaces. Such liquid coverage is required to prevent run-limiting coke formation.

The important data for sizing include vapor rate, density and viscosity. Liquid rate, density and surface tension are also checked as a comparison with the performance of the air/water model and to estimate the drop sizes reporting to the separator.

The inlet pipe size recommended (eight inch diameter) was chosen to provide a calculated liquid drop size.

Figure 4:
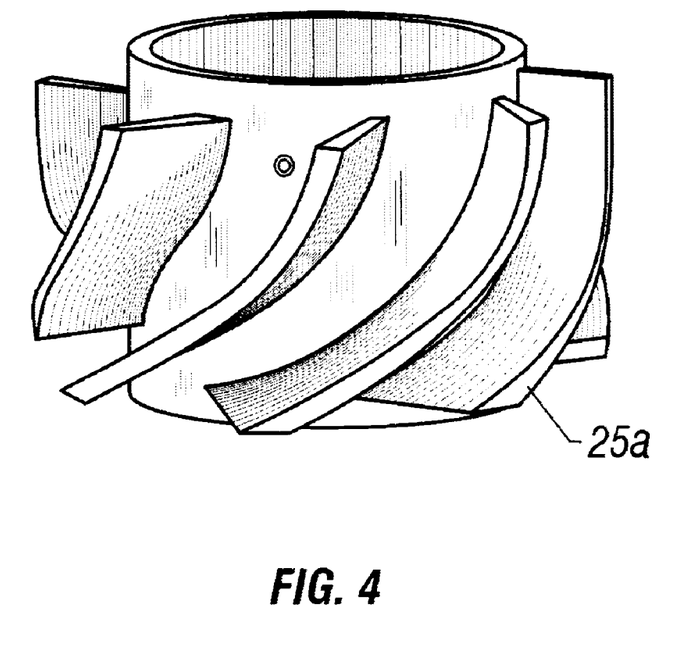
FIG. 4 is a perspective drawing of the vane assembly of the vapor/liquid separator of FIG. 2.

The vane assembly sizing was determined and sized to give a velocity through the vanes of 80–100 Ft/Sec. For Assignee's current design, 18" Schedule 80 pipe and twelve vanes attached to a ten inch diameter Schedule 40 pipe, the estimated velocity is 88 Ft/Sec through the 30° flat section of the vanes. This vane assembly is shown in FIG. 4.

Position of the vane assembly 25a relative to the entrance 14a and 'filling' in of the top head 20b of separator 20 was guided by computational fluid dynamics modeling. The intent was to remove areas of potential recirculation to reduce coking tendencies. The internal shape of the head 20b was formed to follow the stream lines of the gas so the walls 20a would remain washed by liquid that was pushed into the main body of the separator 20.

The distance of the hub 25 extension below the vanes 25a was picked based on estimation of the liquid drop size that would be captured before the drop had moved more than half way past the hub 25. Significant liquid 15 will be streaming down the hub 25 (based on observations with the air/water model) and the presence of a 'skirt' 25b on the hub 25 will introduce liquid droplets into the vapor phase well below the vanes 25a, and collection will continue below the skirt 25b of hub 25 due to the continued swirl of the vapor 16 as it moves to the outlet tube 16a.

The hub skirt 25b was sized to move liquid from the hub 25 as close as possible to the outer wall 20a without reducing the area for vapor 16 flow below that available in the vanes 25a. As a practical matter, about 20% more area for flow has been provided than is present at the vanes 25a.

The distance between the bottom of the hub 25 and the highest point 16c of vapor outlet tube 16a was sized as four times the vapor outlet tube 16a diameter. This was consistent with the air/water model. The intent is to provide area for the vapor to migrate to the outlet 16a without having extremely high radial velocities.

The distance from the entrance 16c of the vapor outlet tube 16a to the centerline of the horizontal portion of vapor outlet pipe 16a, has been chosen as roughly three times the pipe diameter. The intent is to provide distance to keep the vortex vertical above the outlet tube 16a—not have it disturbed by the proximity of the horizontal flow path of the vapor 16 leaving outlet tube 16a. The position and size of the anti-creep ring 16b on the vapor outlet tube 16a are somewhat arbitrary. It is positioned close to, but below, the lip and is relatively small to allow room for coke to fall between the outer wall 20a and the ring 16b.

Details of the separator 20 below the outlet tube 16a have been dictated by concerns outside the bounds of this separator. As long as nothing is done to cause liquid to jet above the inlet 16c to the outlet tube 16a, there should be no impact to separation efficiency.

Chief areas of coking concern involve sections with vapor recirculation, or metal not well washed with liquid. The area 20b inside the top head may be shaped or filled with material to approximate the expected recirculation zone. The inside of the hub 25 is another potential trouble point. If coke were to grow and fall over the inlet 16c to vapor outlet tube 16a, a significant flow obstruction could occur (such as a closed check valve). For this reason, a cage or screen 25c of either rods or a pipe cap may be used. This would not prevent the coke from growing, but would hold most of it in place so that a large chunk is not likely to fall. Areas under the vane skirts and the skirts 16b on the vapor outlet tube 16a are also 'unwashed' and coke growth in these areas is possible.

The lab model on which these design rules have been 'validated' has been tested over a wide range of flow conditions as shown in TABLE 1 below. Air rates ranged from 50–150 Ft/Sec at the inlet and water was tested at 1–4.5 gpm. Over all these conditions, losses were below the measurable range. At water flows less than 1 gpm (estimated at 0.5–0.75 gpm) the wetting of the separator outer wall 20a was less than complete. Streamers of water ran down the plexiglass, with 'dry' areas between. In terms of gpm water per inch of circumference, at 1 gpm water the separator walls 20a were washed at a rate of 0.032 gpm/inch. The design data oil rate, 4,116 Lb/Hr at 41.1 Lb/Ft^3, or 12.5 gpm would give a wash rate of 0.246 gpm/inch.

TABLE 1

| | Low Air/ High Water | High Air/ Low Water | Plant Design Case |
|---|---|---|---|
| Vapor Inlet Velocity, Ft/Sec | 50 | 150 | 83 |
| Vapor Vane Velocity, Ft/Sec | 58 | 150 | 88 |

TABLE 1-continued

| | Low Air/ High Water | High Air/ Low Water | Plant Design Case |
|---|---|---|---|
| Vapor Rate, Lb/Hr | 1454 | 4362 | 45885 |
| Vapor Rate, ACFM | 303 | 909 | 1734 |
| Liquid Rate, Lb/Hr | 2250 | 500 | 4116 |
| Liquid Rate, GPM | 4.5 | 1 | 12.5 |
| Lb Liquid/ Lb Vapor | 1.55 | 0.11 | 0.090 |
| GPM Liquid/ ACFM Vapor | 0.0031 | 0.0011 | 0.0072 |
| GPM Liquid/Inch Separator Circumference | 0.14 | 0.032 | 0.246 |

If the coking tendency of the separator walls 20a is controlled by the wash rate (liquid volumetric flow rate per circumferential inch), the plant design conditions should provide better washing than the lab model. Assuming the plant wash properties track those of the lab, opportunity will exist to operate with feeds having lower liquid volumes. The design data indicate a liquid flow that is 'low' on a weight basis and 'high' on a volume basis, when compared to the lab. However, the lab model showed no to visual problems with separation at liquid rates below 1 gpm or above the 4.5 gpm at which data was taken.

What is claimed is:

1. A vapor/liquid separator comprising:
   a vessel having an inlet for receiving a vapor/liquid mixture;
   a hub axially located within said vessel at a position below said inlet wherein said hub supports a plurality of vane elements at its proximal end for centrifuging said mixture as said mixture proceeds through said vessel;
   a vapor outlet axially spaced from the distal end of said hub for withdrawing the vapor phase of said mixture from said vessel; an outlet located below said vapor outlet for withdrawing the liquid phase of said mixture from said vessel;
   a skirt element located at the distal end of said hub for directing any liquid phase of said mixture in an outward direction away from said hub and toward the walls of said vessel, said skirt having an outer diameter greater than the inlet to said vapor outlet; and
   means located in said vessel between said inlet and said proximal end of said hub to aid wetting of the head and interior walls of said separator thereby preventing the formation of coke in said head area.

2. The apparatus of claim 1 further including:
   a skirt located at the entrance of said vapor outlet for directing any liquid in an outward direction and away from said entrance.

3. A method for separating the vapor and liquid phases of a mixture of hydrocarbon and steam comprising the steps of:
   flowing said mixture through the inlet of a vessel;
   centrifuging said mixture by means of a centrifuge located at the head end of said vessel;
   eliminating stagnant flow areas in the inlet zone of said vessel;
   controlling the recirculation and splashing of said mixture as said mixture falls on said centrifuge;
   flowing said liquid phase down the walls of said vessel;
   directing said vapor phase toward an outlet pipe for collecting said vapors;

directing any liquid dripping from said centrifuging means away from the entrance of said vapor outlet pipe;

directing said vapor phase from said vessel and to means for further processing; and directing said liquid phase from said vessel and to means for further processing.

4. A vapor/liquid separator comprising:

a vessel having an inlet for receiving a vapor/liquid mixture;

a hub axially located within said vessel at a position below said inlet wherein said hub supports a plurality of vane elements at its proximal end for centrifuging said mixture as said mixture proceeds through said vessel;

a vapor outlet axially spaced from the distal end of said hub for withdrawing the vapor phase of said mixture from said vessel;

an outlet located below said vapor outlet for withdrawing the liquid phase of said mixture from said vessel; and a screen covering the distal end of said hub for preventing any coke within the interior of said hub from falling therethrough.

* * * * *

UNITED STATES PATENT AND TRADEMARK OFFICE
CERTIFICATE OF CORRECTION

PATENT NO. : 6,376,732 B1
DATED : April 23, 2001
INVENTOR(S) : Daniel Ngan et al It is certified that error appears in the above-identified patent and that said Letters Patent is hereby corrected as shown below:

<u>Title page,</u>
Under item [57] ABSTRACT, delete entire paragraph and substitute the following therefor:
-- A centrifugal vapor/liquid separator separates the vapor and liquid in a flash of hydrocarbon and steam mixture, such that only the vapor stream is fed and processed further downstream. The design of the separator, including the specially designed shape of the roof, ensures that all partially wetted surfaces in the separator, except the vapor outlet pipe, are well-wetted and washed by the non-vaporized liquid portion of the feed or lay injection of external liquid thus ensuring that no coke deposition occurs inside the separator- The flash temperature in the separator therefore can be increased beyond the typical limit thus achieving a deeper cut into the feed and recovering a larger fraction of the feed as vapor for further downstream processing. --

<u>Column 3, lines 52-67 and Column 4,</u>
Lines 1-27, delete in its entirety and substitute the following therefor:
-- Referring now to Figs. 2 and 3, the vapor/liquid separator 20 is shown in a vertical, partly sectional view in Fig. 2 and in a sectional plan view in Fig. 3. The vapor/liquid separator 20 comprises a vessel having walls 20a, an inlet 14a for receiving the incoming hydrocarbon/steam mixture 14, a vapor outlet 16a for directing the vapor phase 16 and a liquid outlet 15a for directing the liquid phase 15. Closely spaced from the inlet 14a is a hub 25 having a plurality of vanes 25a spaced around the circumference of the hub 25, preferably close to the end nearest the inlet 14a. The vane assembly is shown more clearly in the perspective view of Fig. 4. The incoming hydrocarbon/steam mixture 14 is dispersed by splashing on the proximal end of the hub 25 and, in particular, by the vanes 25a forcing a portion of the liquid phase 15 of the mixture 14 outwardly toward the walls 20a of the vapor/liquid separator 20 thereby keeping the walls 20a completely wetted with liquid and preventing any coking of the interior of the walls 20a. Likewise, the outer surface of the hub 25 is maintained in a completely wetted condition by a liquid layer that flows down the outer surface of hub 25 due to insufficient forces to transport the liquid 15 in contact with the surface of hub 25 to the interior of the walls 20a.

UNITED STATES PATENT AND TRADEMARK OFFICE
CERTIFICATE OF CORRECTION

PATENT NO. : 6,376,732 B1
DATED : April 23, 2001
INVENTOR(S) : Daniel Ngan et al It is certified that error appears in the above-identified patent and that said Letters Patent is hereby corrected as shown below:

A skirt 25b surrounds the distal end of the hub 25 and aids in forcing any liquid transported down the outer surface of the hub 25 to the interior of the walls 20a by depositing said liquid into the swirling vapor. As shown in Fig- 2, the outside diameter of skirt 25b is greater than the inside diameter of the vapor outlet tube 16a in order to prevent liquid that may drip off of skirt 25b from entering the vapor outlet tube 16a. This feature of the invention is especially important at low volumetric gas flow rates wherein the centrifugal force acting on droplets that drip off of skirt 25b may be insufficient to cause them to be deflected radially outwards and away from the opening of outlet tube 16a. The upper portion of the vapor/liquid separator 20 is filled in at 20b between the inlet 14a and hub 25 so as to prevent the formation of stagnant zones along the roof at 20b and to aid wetting of the interior of walls 20a as the vapor/liquid mixture 14 enters the vapor/liquid separator 20. The upper portion of the vapor/liquid separator 20 is also filled in at 20b between the inlet 14a and hub 25 so as to prevent the formation of coke deposits that would otherwise form from the vapor and liquid components of a hydrocarbon feed stock in a thermal cracking application. As the liquid 15 is transported downward, it keeps the walls 20a and the hub 25 washed and prevents the formation of coke on their surfaces. The liquid 15 continues to fall and exits the vapor/liquid separator 20 through the liquid outlet 15a. A pair of inlet nozzles 26 is provided below the vapor outlet tube 16a to provide quench oil for cooling collected liquid 15 and reduce downstream coke formation. The vapor phase 16 enters the vapor outlet duct 16a at its highest point 16c, exits at outlet 16a and proceeds to a vaporizer 17 for further treatment prior to entering the radiant section B 22 of the pyrolysis furnace 10 as shown in FIG. 1. A skirt 16b surrounds the entrance 16c to the vapor duct 16 and aids in deflecting any liquid 15 outwardly toward the separator walls 20a. The skirt 16b is a conically shaped ring that serves to deflect any liquid that may drip off of the hub skirt 25b away from the inlet of vapor outlet 16a. It is also the purpose of skirt 16b to prevent liquid from creeping upwards along the outside walls of vapor outlet 16a and therefore entering vapor outlet 16a. -- .

UNITED STATES PATENT AND TRADEMARK OFFICE
CERTIFICATE OF CORRECTION

PATENT NO. : 6,376,732 B1
DATED : April 23, 2001
INVENTOR(S) : Daniel Ngan et al It is certified that error appears in the above-identified patent and that said Letters Patent is hereby corrected as shown below:

<u>Column 5,</u>
Lines 4-8, delete in its entirety and substitute the following therefor:
-- The hub skirt 25b was sized to move liquid from the hub 25 as close as possible to the outer wall 20a without reducing the area for vapor 16 flow below that available In the vanes 25a. As a practical matter, about 20% more area for flow has been provided than is present at the vanes 25a. Hub skirt 25b was also chosen so that its outermost diameter would be greater than the inside diameter of the vapor outlet tube 16a, as depicted in Fig. 2 and as previously described. --

Signed and Sealed this

Twenty-seventh Day of August, 2002

*Attest:*

*Attesting Officer*

JAMES E. ROGAN
*Director of the United States Patent and Trademark Office*